United States Patent
Vandivier et al.

(10) Patent No.: US 8,335,643 B2
(45) Date of Patent: Dec. 18, 2012

(54) POINT OF INTEREST SEARCH, IDENTIFICATION, AND NAVIGATION

(75) Inventors: Karl Douglas Vandivier, Belleville, MI (US); Dean T. Wisniewski, Detroit, MI (US); Mark Schneider, Northville, MI (US); Jennifer L. Brace, Northville, MI (US); Paul Aldighieri, Grosse Pointe Farms, MI (US); Vilay Patel, Canton, MI (US); Charles Michael Broadwater, Orchard Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 12/853,961

(22) Filed: Aug. 10, 2010

(65) Prior Publication Data

US 2012/0041673 A1    Feb. 16, 2012

(51) Int. Cl.
*G01C 21/30* (2006.01)
(52) U.S. Cl. ........ 701/411; 701/412; 701/418; 701/420; 701/426; 701/438
(58) Field of Classification Search .......... 701/410, 701/411, 412, 418, 420, 426, 438
See application file for complete search history.

(56) References Cited

U.S. PATENT DOCUMENTS

| | | | |
|---|---|---|---|
| 4,937,751 A | 6/1990 | Nimura et al. | |
| 5,177,685 A | 1/1993 | Davis et al. | |
| 5,220,507 A | 6/1993 | Kirson | |
| 5,275,474 A | 1/1994 | Chin et al. | |
| 5,291,412 A | 3/1994 | Tamai et al. | |
| 5,351,779 A | 10/1994 | Yamashita | |
| 5,394,332 A | 2/1995 | Kuwahara et al. | |
| 5,406,491 A | 4/1995 | Lima | |
| 5,406,492 A | 4/1995 | Suzuki | |
| 5,578,748 A | 11/1996 | Brehob et al. | |
| 5,742,922 A | 4/1998 | Kim | |
| 5,767,795 A | 6/1998 | Schaphorst | |
| 5,790,973 A | 8/1998 | Blaker et al. | |
| 5,848,364 A | 12/1998 | Ohashi | |

(Continued)

FOREIGN PATENT DOCUMENTS

WO    2008037471 A2    4/2008

OTHER PUBLICATIONS

Difficult POI search in Streets & Trips, printed from http://www.laptopgpsworld.com/3520-difficult-poi-search-streets-tips, printed Jul. 30, 2010.

(Continued)

*Primary Examiner* — David H Bollinger
(74) *Attorney, Agent, or Firm* — Jennifer M. Stec; Brooks Kushman P.C.

(57) ABSTRACT

A computer-implemented navigation method for identifying one or more points of interest (POI) in a geographic location includes calculating a navigation route and receiving a reference point input. The reference point input may be unrelated to the navigation route and usable for identifying one or more POIs. The method further includes receiving one or more search parameters for searching for one or more POIs with respect to the reference point and identifying the one or more POIs based on the search parameters and reference point. The method also includes presenting the one or more POIs on a vehicle computer display.

9 Claims, 4 Drawing Sheets

U.S. PATENT DOCUMENTS

| | | | |
|---|---|---|---|
| 6,005,494 | A | 12/1999 | Schramm |
| 6,028,537 | A | 2/2000 | Suman et al. |
| 6,101,443 | A | 8/2000 | Kato et al. |
| 6,314,369 | B1 | 11/2001 | Ito et al. |
| 6,374,177 | B1 | 4/2002 | Lee et al. |
| 6,424,363 | B1 | 7/2002 | Matsuba et al. |
| 6,424,888 | B1 | 7/2002 | Sone et al. |
| 6,427,115 | B1 | 7/2002 | Sekiyama |
| 6,427,117 | B1 | 7/2002 | Ito et al. |
| 6,462,676 | B1 | 10/2002 | Koizumi |
| 6,484,092 | B2 | 11/2002 | Seibel |
| 6,484,093 | B1 | 11/2002 | Ito et al. |
| 6,533,367 | B1 | 3/2003 | Latarnik et al. |
| 6,574,538 | B2 | 6/2003 | Sasaki |
| 6,691,025 | B2 | 2/2004 | Reimer |
| 6,791,471 | B2 | 9/2004 | Wehner et al. |
| 6,829,529 | B2 | 12/2004 | Trefzer et al. |
| 6,834,229 | B2 | 12/2004 | Rafiah et al. |
| 6,866,349 | B2 | 3/2005 | Sauter et al. |
| 6,904,362 | B2 | 6/2005 | Nakashima |
| 7,053,866 | B1 | 5/2006 | Mimran |
| 7,089,110 | B2 | 8/2006 | Pechatnikov et al. |
| 7,113,107 | B2 | 9/2006 | Taylor |
| 7,167,799 | B1 | 1/2007 | Dolgov et al. |
| 7,243,134 | B2 | 7/2007 | Bruner et al. |
| 7,369,938 | B2 | 5/2008 | Scholl |
| 7,486,199 | B2 | 2/2009 | Tengler et al. |
| 7,571,042 | B2 | 8/2009 | Taylor et al. |
| 7,642,901 | B2 | 1/2010 | Kato et al. |
| 7,653,481 | B2 | 1/2010 | Tramel |
| 7,726,360 | B2 | 6/2010 | Sato et al. |
| 7,818,380 | B2 | 10/2010 | Tamura et al. |
| 7,822,380 | B2 | 10/2010 | Wu |
| 7,822,546 | B2 | 10/2010 | Lee |
| 7,826,945 | B2 | 11/2010 | Zhang et al. |
| 7,920,969 | B2 | 4/2011 | Mudalige et al. |
| 2001/0001847 | A1 | 5/2001 | Hessing |
| 2002/0087262 | A1 | 7/2002 | Bullock et al. |
| 2003/0040868 | A1 | 2/2003 | Fish et al. |
| 2004/0021583 | A1 | 2/2004 | Lau et al. |
| 2004/0117108 | A1 | 6/2004 | Nemeth |
| 2005/0085956 | A1 | 4/2005 | Losey |
| 2005/0144573 | A1 | 6/2005 | Moody et al. |
| 2005/0159881 | A1 | 7/2005 | Furukawa |
| 2006/0026335 | A1 | 2/2006 | Hodgson et al. |
| 2006/0089788 | A1* | 4/2006 | Laverty .................... 701/202 |
| 2006/0168627 | A1 | 7/2006 | Zeinstra et al. |
| 2006/0172745 | A1 | 8/2006 | Knowles |
| 2006/0184314 | A1 | 8/2006 | Couckuyt et al. |
| 2006/0190164 | A1 | 8/2006 | Glaza |
| 2006/0241857 | A1 | 10/2006 | Onishi et al. |
| 2007/0038362 | A1 | 2/2007 | Gueziec |
| 2007/0050248 | A1 | 3/2007 | Huang et al. |
| 2007/0093955 | A1 | 4/2007 | Hughes |
| 2007/0104224 | A1 | 5/2007 | Conner et al. |
| 2007/0143482 | A1 | 6/2007 | Zancho |
| 2007/0143798 | A1 | 6/2007 | Jira et al. |
| 2007/0198172 | A1 | 8/2007 | Sumizawa et al. |
| 2007/0203643 | A1 | 8/2007 | Ramaswamy et al. |
| 2007/0203646 | A1 | 8/2007 | Diaz et al. |
| 2007/0213092 | A1 | 9/2007 | Geelen |
| 2007/0273624 | A1 | 11/2007 | Geelen |
| 2007/0290839 | A1 | 12/2007 | Uyeki et al. |
| 2008/0065318 | A1 | 3/2008 | Ho |
| 2008/0147308 | A1 | 6/2008 | Howard et al. |
| 2008/0195305 | A1 | 8/2008 | Jendbro et al. |
| 2008/0228346 | A1 | 9/2008 | Lucas et al. |
| 2009/0143934 | A1 | 6/2009 | Motonaga et al. |
| 2009/0196294 | A1 | 8/2009 | Black et al. |
| 2009/0254266 | A1 | 10/2009 | Altrichter et al. |
| 2009/0259354 | A1 | 10/2009 | Krupadanam et al. |
| 2009/0326801 | A1 | 12/2009 | Johnson et al. |
| 2010/0010732 | A1 | 1/2010 | Hartman |
| 2010/0048184 | A1 | 2/2010 | Kim |
| 2010/0088018 | A1 | 4/2010 | Tsurutome et al. |
| 2010/0088029 | A1 | 4/2010 | Hu et al. |
| 2010/0094550 | A1 | 4/2010 | Tsurutome et al. |
| 2010/0174485 | A1 | 7/2010 | Taylor et al. |
| 2010/0191463 | A1 | 7/2010 | Berry et al. |
| 2010/0198508 | A1 | 8/2010 | Tang |
| 2010/0217482 | A1 | 8/2010 | Vogel et al. |
| 2010/0241342 | A1 | 9/2010 | Scalf et al. |
| 2010/0245123 | A1 | 9/2010 | Prasad et al. |
| 2011/0004523 | A1 | 1/2011 | Giuli et al. |
| 2011/0046883 | A1 | 2/2011 | Ross et al. |
| 2011/0255481 | A1 | 10/2011 | Sumcad et al. |
| 2012/0004841 | A1 | 1/2012 | Schunder |
| 2012/0029806 | A1 | 2/2012 | Scalf et al. |
| 2012/0029807 | A1 | 2/2012 | Schunder |

OTHER PUBLICATIONS

POI Along Route Qs, Printed from http://www.tomtomforums.com, printed Jul. 30, 2010.

Ford Motor Company, "Navigation System: SYNC," Owner's Guide Supplement, SYNC Version 1 (Jul. 2007).

Ford Motor Company, "SYNC," Owner's Guide Supplement, SYNC Version 1 (Nov. 2007).

Ford Motor Company, "Navigation System: SYNC," Owner's Guide Supplement, SYNC Version 2 (Oct. 2008).

Ford Motor Company, "SYNC," Owner's Guide Supplement, SYNC Version 2 (Oct. 2008).

Ford Motor Company, "Navigation System: SYNC," Owner's Guide Supplement, SYNC Version 3 (Jul. 2009).

Ford Motor Company, "SYNC," Owner's Guide Supplement, SYNC Version 3 (Aug. 2009).

Kermit Whitfield, "A hitchhiker's guide to the telematics ecosystem", Automotive Design & Production, Oct. 2003, http://findarticles.com, pp. 1-3.

Findlater et al., Impact of Screen Size on Performance, Awareness, and User Satisfaction with Graphical User Interfaces, Association for Computing Machinery (ACM), Apr. 5-10, 2008, pp. 1247-1256, see Fig. 1.

Garmin Garage, Follow the Leader, www.garmin.com/garmin/cms/site/us.

TomTom, portable car navigation systems, http://www.tomtom.com, Feb. 6, 2009.

MapQuest Maps—Driving Directions—Map, http://www.mapquest.com, Aug. 25, 2009.

Multi-Modal Navigation Tools, TDM Encyclopedia, Jan. 26, 2010.

Google Maps Finally Adds Bike Routes, Mary Catherine O'Connor, Mar. 10, 2010, printed from www.wired.com/autopia/2010/03/google-maps-for-bikes/.

http://www.rated4stars.com/html/gps-saves-gas.html.

http://www.gps.cx/index.php?c=1&n=493964&i=B001LTHONU&x=GPS_Buddy_FE01US_Fuel_Economy_Software_Package.

http://www.gpsmagaziine.com/2009/02/hands-on_with_garmins_new_ecor.php (Feb. 2009).

http://www.nrel.gov/vehiclesandfuels/vsa/pdfs/42557.pdf (Apr. 2008).

http://green.autoblog.com/2009/03/05/sentience-research-vehicle-shows-how-tons-of-data-can-save-milli/ (Mar. 2009).

http://reviews.cnet.com/8301-13746_7-10189749-48.html.

Navigator—A Talking GPS Receiver for the Blind, Ryszard Kowalik and Stanislaw Kwasniewski, Gdansk University of Technology, 2004.

Speech-Enabled Web Services for Mobile Devices, M. Hu, Z. Davis, S. Prasad, M. Schuricht, P.M. Melilar-Smith and L.E. Moser, Department of Electrical and Computer Engineering, University of California, Santa Barbara, CA 93106.

* cited by examiner

POINT OF INTEREST SEARCH, IDENTIFICATION, AND NAVIGATION

BACKGROUND

1. Technical Field

Various illustrative embodiments relate to searching and identifying points-of-interest (POIs) and navigating to these POIs. The POIs may be off-route with respect to the user's destination route and identified irrespective of the route or the vehicle's geographic location.

2. Background Art

Navigation systems, both vehicle-installed and portable, may offer a point of interest (POI) search as an easy and quick way of searching for well-known destination points. POIs can include hotels, restaurants, amusements parks, coffee shops, and the like. When a POI is selected, the POI can be set as a final destination or a "waypoint," i.e., an intermediary point along the route.

Often, navigation systems provide limited options for searching for a POI. For example, a user can search for a POI along the route, in a city, near the final destination, or by name. These search options come in handy if a driver is searching for a POI based on these filters. Even if a driver searches by POI name, the navigation system may find the POIs near the vehicle's location or along the route. This presents a challenge, however, if the driver wants to search for a POI that is not along the route or nearby.

Various examples exist in the art that disclose forms of navigation to POIs that are off an intended route. For example, U.S. Publication No. 2010/0088018 to Tsurutome et al. discloses a glance ahead navigation system. The navigation system allows a user to easily "glance ahead" down a route to see points-of-interest (POI) such as businesses along future portions of a route. POIs within a short distance radius of a selected future exit or other future point along the user's route may be presented to the user via an appropriate display. The short distance radius may be defined by constraints associated with the display (e.g., within a represented distance from the exit that can be shown in a current zoom level of the display). Instead of abandoning a navigation session, use of glance ahead suspends navigation while the user views snapshots of points-of-interest at each exit. The navigation system may show branded icons or business details associated with displayed POIs without the need for the user to access a separate screen.

U.S. Publication No. 2010/0094550 to Tsurutome et al. discloses a user interface for dynamic user-defined stopovers during guided navigation. The navigation device includes a route determiner module to formulate a first route from a first geographic location to a second geographic location. A route presentation module presents the first route to a user of the navigation device. A side trip presentation module presents a point-of-interest to the user of said navigation device and formulates a second route to said point-of-interest. An options module presents an option, during presentation of the first route, to recalculate the first route to the second geographic location to comprise the second route.

SUMMARY

In a first illustrative embodiment, a computer-implemented navigation method for identifying one or more points of interest (POI) in a geographic location includes calculating a navigation route and receiving a reference point input. The reference point input may be unrelated to the navigation route and usable for identifying one or more POIs.

In this illustrative embodiment, the method further includes receiving one or more search parameters for searching for one or more POIs with respect to the reference point and identifying the one or more POIs based on the search parameters and reference point.

The method also includes presenting the one or more POIs on a vehicle computer.

In a second illustrative embodiment, a navigation system for navigating to one or more points of interest includes at least one vehicle computer configured to receive a reference point, unrelated to a navigation route, for identifying one or more POIs.

The illustrative system also includes a computer configured to receive one or more search parameters for searching for one or more POIs with respect to the reference point and receive sorting criteria for sorting the POIs.

The exemplary computer is further configured to identify the one or more POIs based on the search parameters, the sorting criteria and the reference point.

The computer is also configured to receive a selection of the one or more POIs sorted based on the sorting criteria and calculate the navigation route to the selected one or more POIs in response to the selection.

Finally, the illustrative computer is configured to present the navigation route.

In a third illustrative example, a system includes a vehicle computer configured to calculate a navigation route and receive a reference point, unrelated to the navigation route, for identifying points of interest (POIs).

The illustrative vehicle computer is also configured to search POIs using search parameters relative to the reference point and retrieve POIs stored on the vehicle computer.

The illustrative vehicle computer is further configured to, based on the search, identify POIs discovered in the search correlating with the stored POIs. Finally, the computer is configured to present the correlating POIs on a vehicle computer display.

These and other aspects will be better understood in view of the attached drawings and following detailed description of the invention.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION OF ILLUSTRATIVE EMBODIMENTS

Illustrative embodiments of the invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Assume a driver, who is driving across multiple state lines, desires to stay the night in a hotel, visit a restaurant, or visit a particular coffee shop that is well off the driving route. The driver may input a search for a POI around a destination or a waypoint, but, in the noted instances, a navigation system may limit the number of POIs and, therefore, the POIs may not correspond to those that the driver desires. Further, the driver may not have any waypoints set along the route and rather desire to find a POI regardless of what is in or around the route.

As part of the POI search, the driver may have to search through multiple screens before the POI is found. Alternatively, the POI may not be found at all. Ultimately, the driver may have to input an address (if the driver knows it) for the POI (which may occur while driving) and re-program the navigation route to include this POI as a new final destination or a waypoint. This is not only inconvenient for the driver, but unhelpful if the driver desires to visit a particular POI that is not in or around the route.

Figure 1:
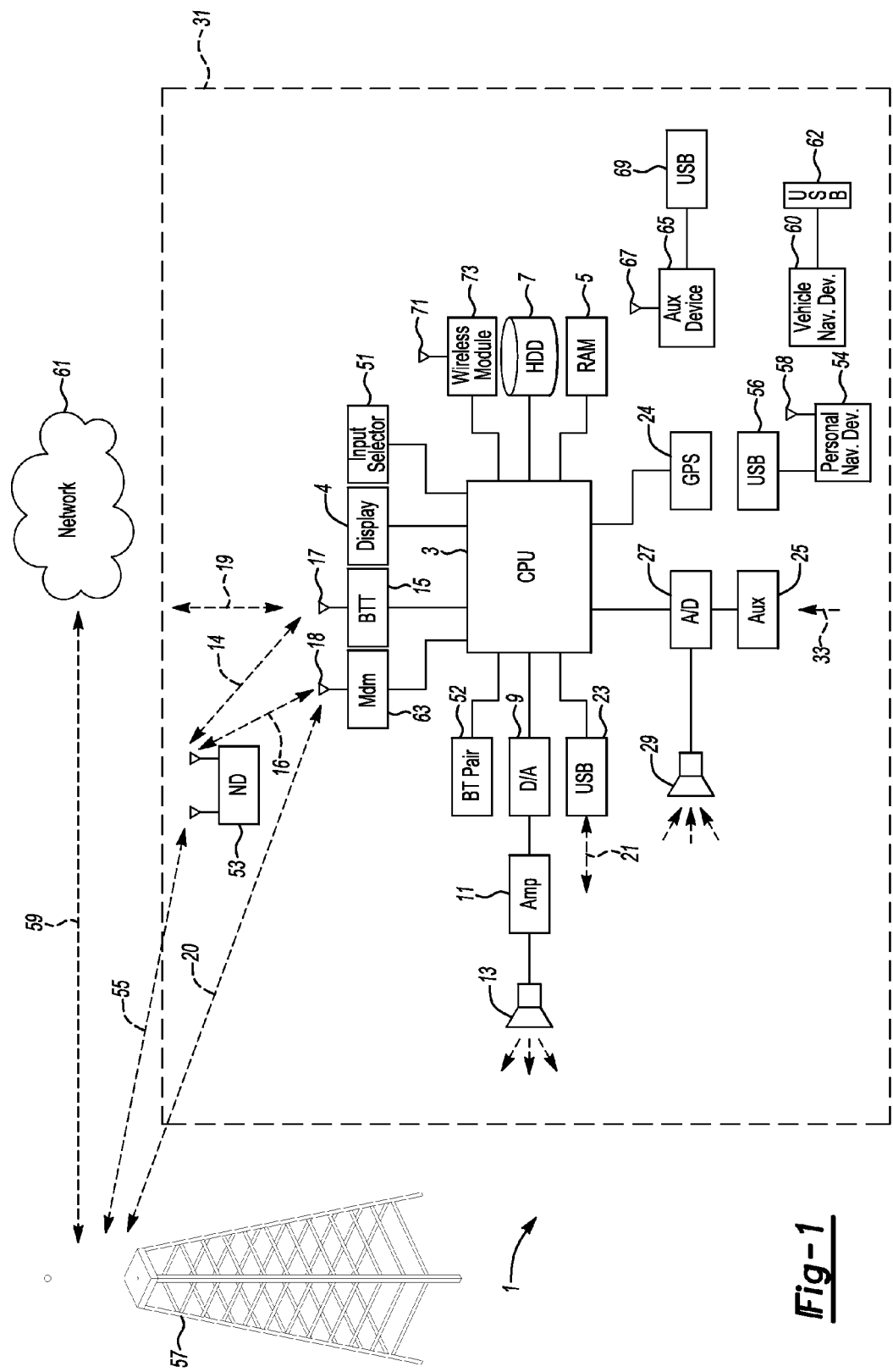
FIG. 1 is an exemplary block diagram of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless module 73, using for example a WiFi 71 antenna.

This could allow the CPU to connect to remote networks in range of the module 73. Auxiliary device 65 may include, but are not limited to, personal media players, wireless health devices, portable computers, and the like.

Figure 2:
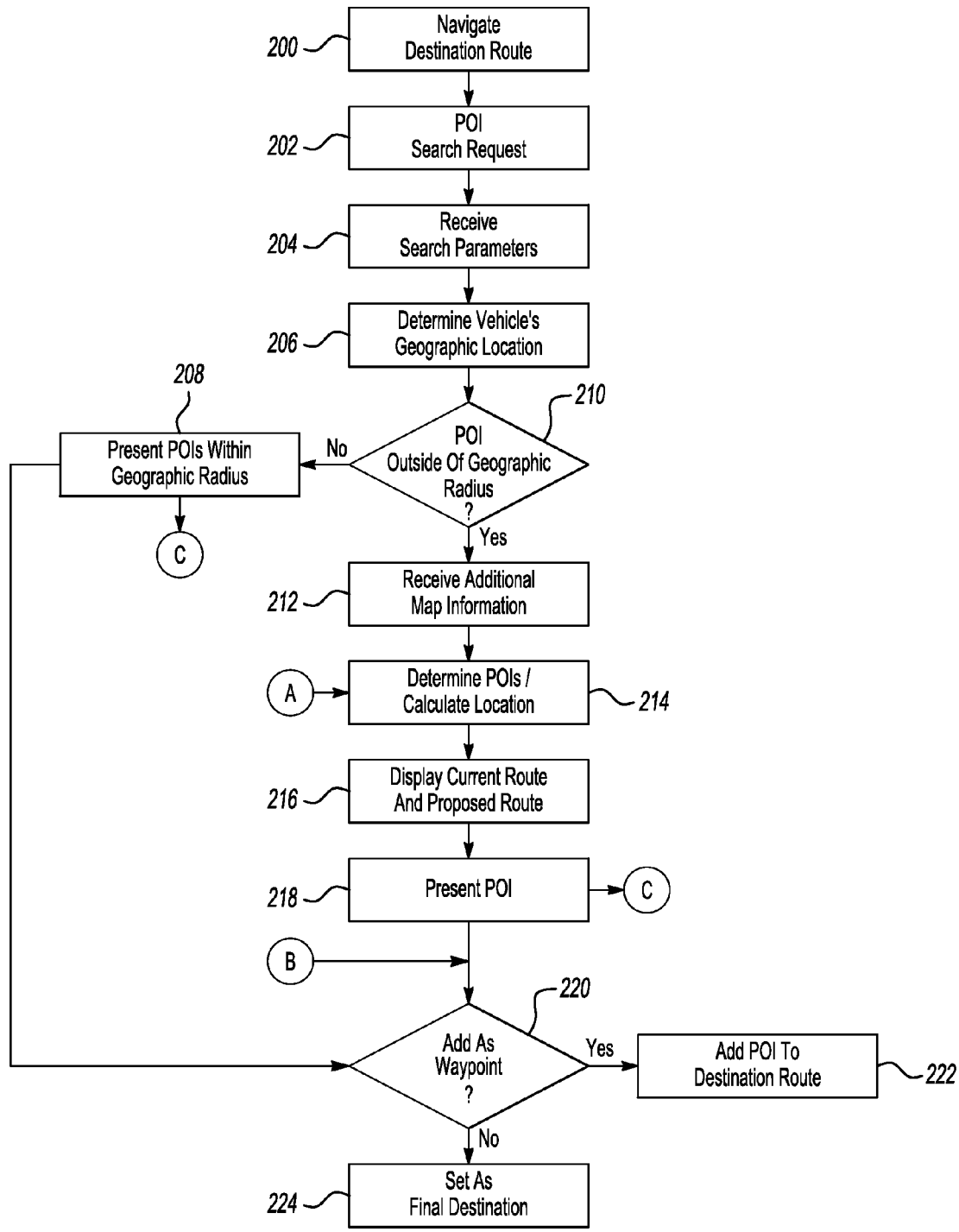
FIG. 2 is a process for a point-of-interest (POI) search and identification which is off the destination route according to the one of the various embodiments.

FIG. 2 illustrates a search and identification process for a POI that is not on or near the user's destination route. It will be appreciated that identification of POIs may be performed according to known methods (e.g., POIs on or near the route, in the city, etc.). FIG. 2, illustrates a process for identifying POIs that can be located anywhere, regardless of the vehicle's location or the route. It will be appreciated that the disclosure and arrangement of FIG. 2 may be modified or re-arranged to best fit a particular implementation of the various illustrative embodiments.

A navigation system 54/60 may navigate a user along a route according to destination criteria input by the driver or other vehicle occupant (block 200). The route may be calculated and navigated according to well-known methods. A POI search may performed during the route navigation in response to a POI search request input by a vehicle occupant (block 202). It will be appreciated that the request for a POI search during vehicle operation is provided for illustrative purposes. The POI search according to the various embodiments described below may alternatively or additionally occur when the vehicle is stationary.

Figure 3:
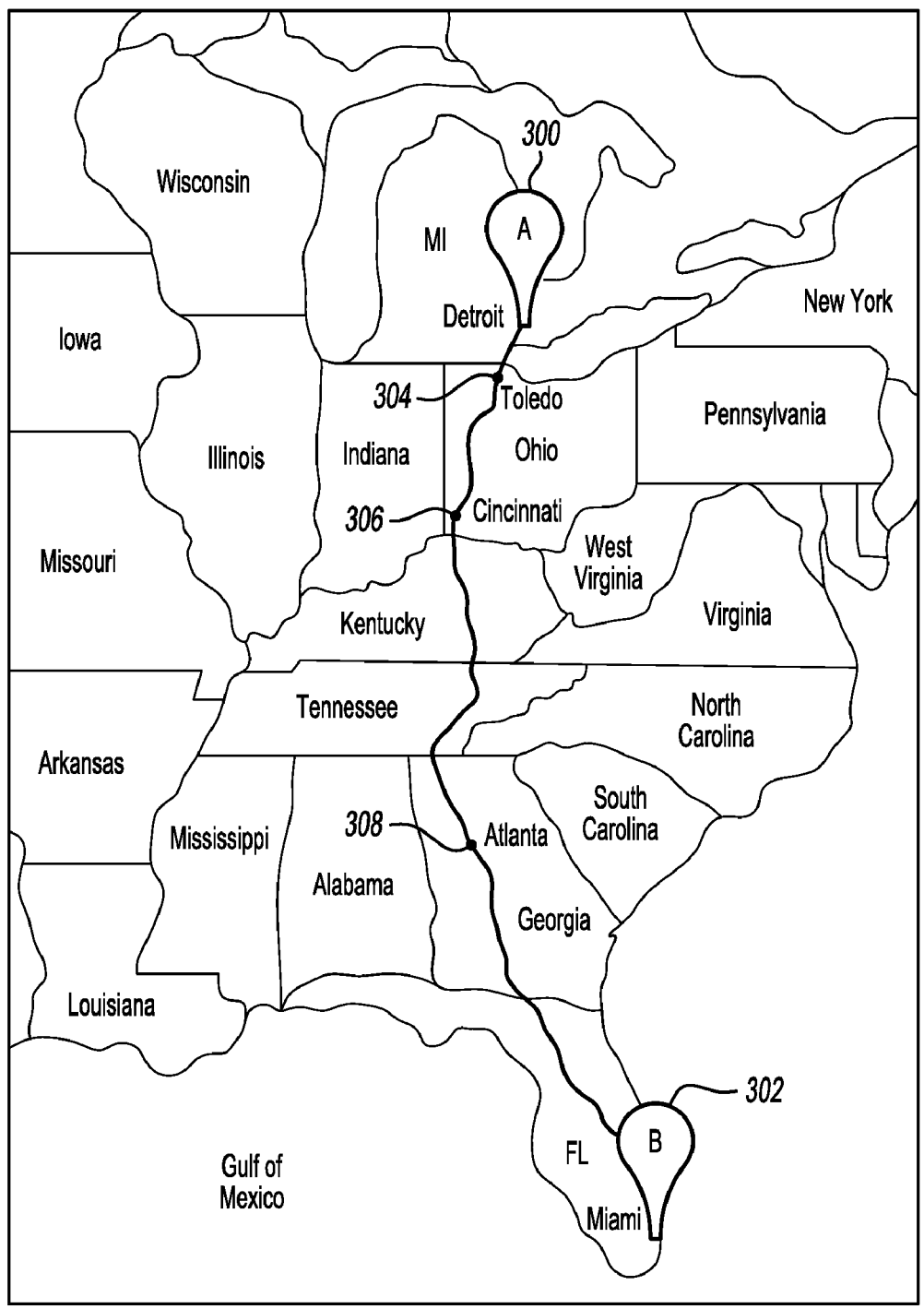
FIG. 3 is a map representing a driving route.

To further illustrate the various embodiments of the invention, the following non-limiting example may be helpful which will be explained with reference to FIG. 3. Driver A is driving from Detroit, Mich. 300 to Miami, Fla. 302. Before the drive begins, Driver A enters the final destination into the navigation system and a route is generated. With the drive being over 20 hours, Driver A knows that stops will be made along the way, including an overnight stay at a hotel, but would rather make the decision as to when and where to stay at some point during the drive. Accordingly, with the final destination entered into the navigation system, Driver A begins the drive and the navigation system navigates the route (block 200).

As Driver A enters Toledo, Ohio 304, Driver A decides that a stop will be made for lunch in or around Cincinnati, Ohio 306 which is over 200 miles away. If POIs are requested while in Toledo, Ohio, Driver A is aware that restaurants along the route or in the city of Toledo may be presented. Entering the name of a restaurant may lead to a similar problem, particularly if it is a chain restaurant. Further, Driver A could enter a search for POIs in Cincinnati itself, but this may require entering additional inputs than otherwise required. Further, Driver A may desire to find a POI around Cincinnati, not necessarily in Cincinnati itself.

Referring back to FIG. 2, a POI search may be requested (block 202). The search parameters may be requested by the navigation system and input by a vehicle occupant (block 204). The search parameters may be input using tactile and/or verbal inputs. For example, a vehicle occupant may input the search parameters through the touchscreen display 4 and/or speak the input. In some embodiments, at least some portions of the display 4 may be blocked out in order to prevent distraction to a driver.

Various search parameters may be input. However, as will be described with respect to FIG. 4, the number of inputs that may be input by the vehicle occupant is limited or minimized for ease of use. This may be accomplished using particular logic programmed to the navigation system. The various parameters may include, but are not limited to, a distance parameter, a directional parameter, a landmark parameter, a geographic parameter, a name parameter, a time parameter, and a zip code parameter.

Figure 5:
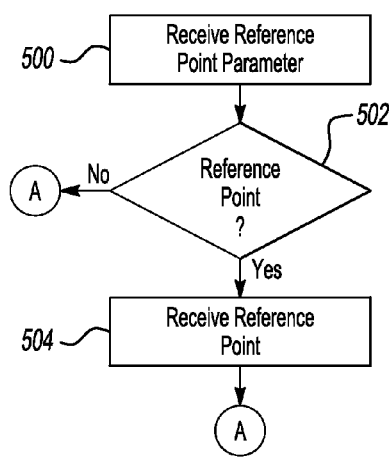
FIG. 5 is a process for determining the points of interest identified in an off-route POI search based on a reference point.

In some embodiments, some parameters may be based on a reference point. For example, Driver A may desire to find a POI around Cincinnati (which is neither "near" the route nor near the destination). Thus, Driver A may use the above parameters to find POIs around Cincinnati. As an example, Driver A may want a restaurant 20 miles outside (in any direction) from Cincinnati. As another example, Driver A may desire to eat at a restaurant east (i.e., a directional parameter) of Bengals stadium (i.e., a reference point). Driver A may also search for a restaurant that is 10 miles (i.e., a distance parameter) east (i.e., a directional parameter) of Bengals stadium (i.e., the reference point). As another example, Driver A may search for a restaurant that is 15 minutes from Bengals stadium. In some embodiments, the navigation system may use traffic and roadway information received from commercial or proprietary traffic systems. Accordingly, various combinations and numbers of reference point parameters and POI search parameters may be used. FIG. 5, described below, provided further details of this process.

It should be understood that, in this case, Driver A does not have to enter the reference point as a waypoint or destination on the route and search around the waypoint/destination, which may only provide results near the waypoint/destination. Rather, Driver A can assign an arbitrary reference point and search for any POI around the reference point using one or more search parameters, which may generate more relevant and useful results for Driver A.

These parameters may be input using a tactile input using, e.g., an alpha or QWERTY keyboard, and/or verbal inputs. The VCS 1 (or navigation system) may be configured with "smart" logic for predicting the parameter, e.g., as it is being typed.

In some embodiments, the POI search parameters may be predefined. For example, a vehicle occupant may select, as a distance parameter, from a selection of 10 miles, 50 miles, 75 miles, 100 miles, and the like. It should be understood that these are merely examples and should not be considered limiting.

In some embodiments, the geographic location of the vehicle may be determined (block 206). This may be performed when, for example (and without limitation), a distance parameter is not input. Additionally or alternatively, the geographic location of the vehicle may be used to present POIs on or near the driver's route as is known in the art (block 208).

The navigation system 54, 60 may be configured to present POI information within a particular geographic area. This may be to show results that are most relevant to the driver (e.g., those that are on or near the route).

Figure 6:
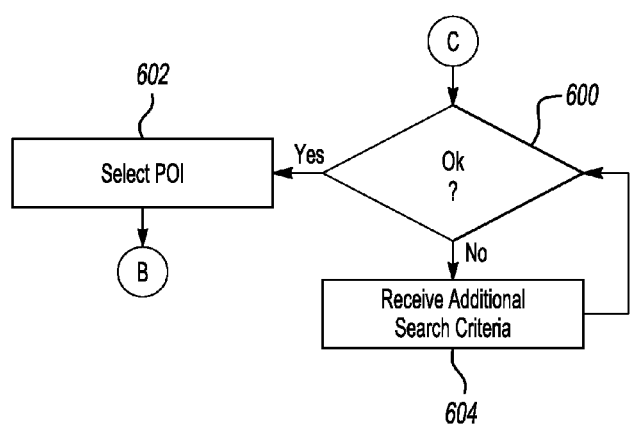
FIG. 6 is a process illustrating a filtering process for an off-route POI determination.

If the POI is outside the predefined geographic area (block 210), the navigation system 54, 60 may receive additional map information via a map database storing navigation maps. This map database (not shown) may communicate with the navigation system via network 61. As will be described below, this map database may also provide data for "predicting" the POI candidates as part of the data filtering process (FIG. 6).

If the POI is outside of the predetermined geographic limit, additional map information may be received from the map database (block 212). The predefined geographic limit may be based on a radius around the distance of the vehicle.

The navigation system may search and identify the POIs that satisfy the vehicle occupant's criteria. For example, using the example above, Driver A may have entered as a parameter "Cincinnati." The navigation system may determine the POIs (e.g., restaurants) in Cincinnati (block 214). In some embodiments, the location with respect to the vehicle may also be calculated. Here, the geographic location of the vehicle may also be utilized (block 206). As will be further described below with respect to FIG. 4, the results may be further filtered and/or sorted according to various criteria. Accordingly, the results are based on criteria other than along or near the route. It should be understood that the POIs may be identified according to this criteria, however, it is not a default criteria as in many commercially available navigation systems.

Referring to FIG. 5, as described above, in some embodiments, the POIs may be determined based on a reference point. The reference point may be a geographic location (or other location-based parameter including, but not limited to, an address, city, county, district, a border line, zip code, and the like) or another POI (such as a landmark, restaurant, coffee house, stadium complex, and the like). Some non-limiting examples of the use of such a reference point are provided above. In this case, the reference point parameter may be received (block 500). In some embodiments, a determination may be made whether the parameter is a reference point (block 502) since there may be overlap between the types of parameters used for the general POI search (as described above) and the reference point. Accordingly, in some embodiments, the vehicle occupant may be asked if the search parameter is a reference point parameter.

If not, a POI determination may be made as represented by circle block A (and continued in FIG. 2). If the parameter is a reference point parameter, the reference point may be received (block 504). As represented by circle block A (continued in FIG. 2), the POIs may be determined (block 214). For example, using a zip code as a reference point, Driver A (in the example above), desires a list of restaurants that are a 10 mile radius around the zip code (10 miles around the entire zip code, 10 miles around an arbitrary or predetermined point representative of the zip code, etc). The navigation system may determine the POIs based on these criteria (e.g., the zip code as the reference point parameter and 10 miles as the distance POI search parameter).

Referring back to FIG. 2, a vehicle occupant may be presented with a comparison screen providing a comparison of the original route and the proposed route with the one or more POIs mapped on the proposed route (block 216). Thus, the user may be presented with a graphical representation of the detour (if any) that the driver may be taking by visiting the POI. In one embodiment, map data may be transmitted to the navigation system 54, 60 from the map database and a proposed route calculated with the identified POIs. The proposed route may be displayed on at least part of the display 4. The current route may or may not be displayed on display 4. In another embodiment, the proposed route may be overlaid on top of the current route as a basis of comparison. The overlay may be accomplished using software and programming methods that are well known in the art.

As described above with respect to FIG. 1, the VCS 1 may be configured with a display 4 as an output. In one embodiment, the vehicle 31 may have at least two displays (not shown). For example, and without limitation, the vehicle computing system 1 may include a display in a center stack of a vehicle and one or more displays in the instrument panel (IP). These displays may share an identical hardware interface and may comprise of different clock speeds. All, or at least one, of these displays may be touch screen. The information displayed on the center stack display may be displayed in the instrument panel display. However, different information may also be displayed on both displays. As an example, the IP panel display may display the current route (or at least part of it) and the center stack may display the proposed route.

As illustrated in block 218, the POIs may be presented to the vehicle occupant. In some embodiments, the POIs may be displayed as an alternative to displaying the proposed route (as described above). In other embodiments, the POIs may be displayed concurrently with the proposed route. The user may configure the presentation of POIs using a settings menu provided with the navigation program.

In one embodiment, as illustrated in FIG. 6 and represented by circle block C, the POI results may be filtered/sorted according to various criteria. The filtering/sorting process may or may not occur after the results are presented to a vehicle occupant in response to a POI search. For purposes of illustration and clarity, the filtering/sorting process is illustrated as occurring after the POIs are presented to the vehicle occupant.

As illustrated in FIG. 6, the POIs are presented (block 218) and a determination may be made if further filtering/sorting is required (block 600). Further filtering/sorting may be required based on a user request for filtering/sorting. The user request may be received as a tactile input and/or a verbal input. Alternatively or additionally, filtering/sorting may be required if the user configured the navigation program for filtering and/or sorting results (e.g., from a settings menu on the navigation system). Filtering/sorting criteria may include, but is not limited to, alphabetical order, reverse alphabetical order, price, user ratings, time, etc. As one example, Driver A, when presented with the restaurants resulting from the search (e.g., restaurants in a 10 mile radius from Bengals Stadium), may filter the results according to ratings of the restaurants.

If no filter/sorting is required, a POI may be selected (block 602). However, as described above, if further filtering/sorting is required, the filter/sorting criteria may be received (block 604) and the results filtered/sorted. If not further filtering/sorting is required, the POI may be selected (block 602).

Referring back to FIG. 2, once a POI is selected (as illustrated by circle block B), it may be determined if the POI selection should be added as a waypoint (block 220). A vehicle occupant may or may not want to add the POI as a waypoint. For example, if Driver A is only taking a break, the lunch stop may be set as a waypoint to the current route. A vehicle occupant may set a POI as a waypoint by selecting a graphical button on the display or inputting a verbal command to set as a waypoint. Since Driver A desires to add the restaurant as a waypoint, the POI is added to the route (block 222).

Driver A may, however, want to set the POI as a destination. As an example, referring back to the map illustrated in FIG. 3, Driver A may perform a similar search as described above for a hotel in Atlanta, Ga. 308. Upon selection of a POI by Driver A, the POI (i.e., the hotel in Atlanta, Ga.) may be set as a final destination (block 224). The route may be re-calculated and the route navigated.

Figure 4:
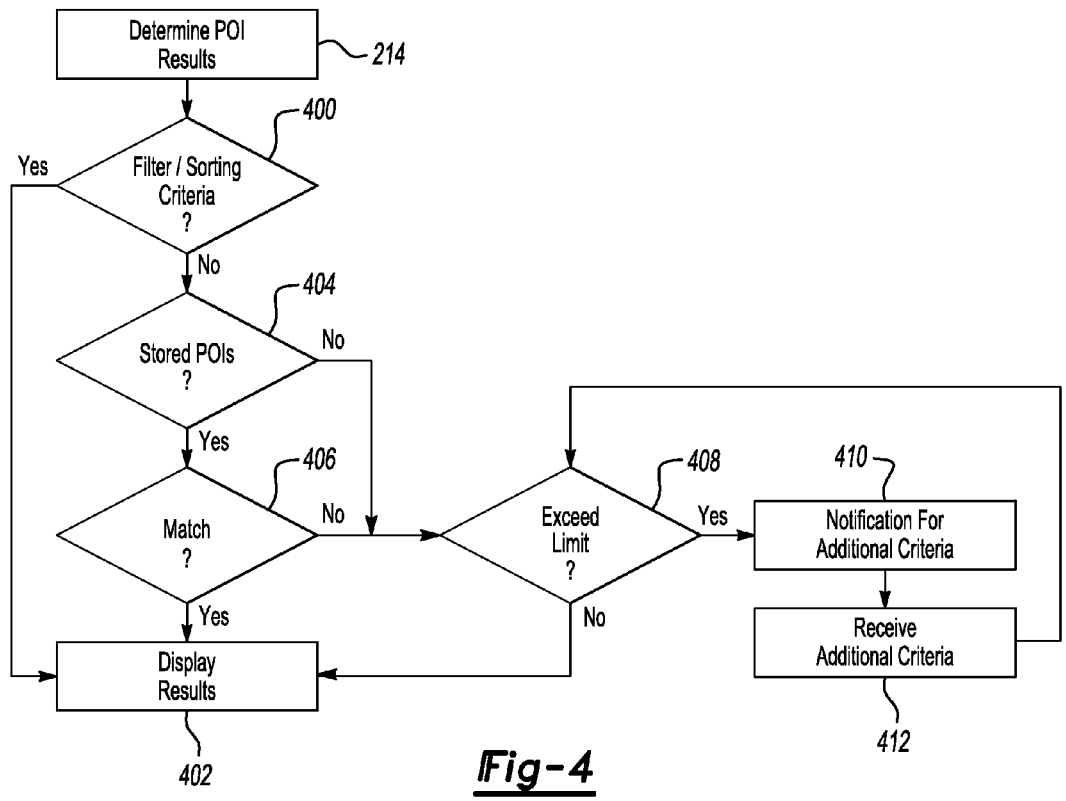
FIG. 4 is a process for determining the points of interest identified in an off-route POI search.

FIG. 4 illustrates an additional process for selecting POIs for presentation to the vehicle occupant. Some POIs may be stored in memory of the navigation system 54,60 as favorites and/or previously visited destinations as is common with most navigation systems. In this case, the navigation system may utilize the favorites and/or previously visited destinations in determining which POIs to present to the vehicle occupant (block 402). Accordingly, the POIs may be determined (block 214) and compared against the favorites and/or previously visited destinations (block 404).

However, in some embodiments, where there may be filtering/sorting criteria, the criteria may be given priority over the favorites/recently visited destinations based on settings set by the user of the navigation system. If filtering criteria priority is set, a determination may be made if there are filtering/sorting criteria (block 400). If so, then the results may be displayed based on the selected criteria (block 402).

If filtering/sorting criteria is not set, it may be determined if there are favorite and/or recently visited destinations stored (block 404). If so, these entries may be compared with the determined POIs to determine if a match exists (block 404). If so, then the matching results may be displayed to the vehicle occupant. Of course, the match may also be based on venue name. It may be that because these venues are set as favorites and/or were recently visited, the vehicle occupant may want to visit a familiar venue. Accordingly, these may presented in a manner that signifies the priority given to these venues (e.g., without limitation, at or near the top of the POI list).

The navigation system may be configured with a threshold value for the number of POIs that may be presented to the vehicle occupant. The number may be limited based on the number of individual items and/or the number of pages having the POI items that may be displayed. These threshold values may be implemented in order to avoid presenting the vehicle occupant with too many POIs.

If the number of POIs is not above the threshold, the POIs may be displayed (block 402). However, if the limit is exceeded (block 408), a notification may be transmitted to modify the POI search criteria (block 410). This may include, but is not limited to, adding an additional search criteria or changing the original search criteria. For example, if the number of results based on Driver A's request for hotels that are within a 20 mile radius of Atlanta, Ga. 308 exceeds the limit, Driver A may add modify the search by request for POIs that are 20 miles west (i.e., a directional parameter) of Atlanta, Ga. Additionally or alternatively, Driver A may ask for POIs that are within a 10 mile radius of Atlanta, Ga.

Accordingly, the additional criteria may be received (block 412). Unless the results still exceed the threshold, the results may be displayed to the vehicle occupant (block 402).

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed:

1. A navigation system for navigating to one or more points of interest, the system comprising:
   at least one vehicle computer configured to:
   receive a reference point, unrelated to a navigation route, for identifying one or more POIs;
   receive one or more search parameters for searching for one or more POIs with respect to the reference point;
   receive sorting criteria for sorting the POIs, wherein the sorting criteria includes at least one of a rating, a price, a time, alphabetical order, or reverse alphabetical order;
   identify the one or more POIs based on the search parameters, the sorting criteria and the reference point;
   receive a selection of the one or more POIs sorted based on the sorting criteria;
   calculate the navigation route to the selected one or more POIs in response to the selection; and
   present the navigation route.

2. The navigation system of claim 1 wherein the at least one vehicle computer is configured to calculate the navigation route to the one or more sorted POIs during navigation of a navigation route.

3. The system of claim 1 wherein the vehicle computer is further configured to modify an original navigation route to include the navigation route to the one or more sorted POIs, wherein the original navigation route is calculated before calculating the navigation route to the one or more sorted POIs.

4. The system of claim 3 further comprising at least one display, wherein the vehicle computer is further configure to present the navigation route to the one or more sorted POIs and the original navigation route on the display.

5. The system of claim 1 wherein the at least one vehicle computer is further configured to:
   receive one or more POIs stored in memory;
   determine one or more identified POIs correlating with the stored POIs; and
   present the one or more POIs correlating with the stored POIs on a vehicle computer.

6. The system of claim 1 wherein the at least one vehicle computer configured to receive one or more search parameters is further configured to:
   receive at least two search parameters; and
   identify the one or more POIs based on the at least two search parameters and the sorting criteria.

7. A system comprising:
   a vehicle computer configured to:
   calculate a navigation route;
   receive a reference point, unrelated to the navigation route, for identifying points of interest (POIs);
   search POIs using search parameters, defined by received input, relative to the reference point;
   predict the search parameter as the input is being received identify POIs discovered in the search correlating with POIs stored on the vehicle computer; and
   present the correlating POIs on a vehicle display.

8. The system of claim 7 wherein the vehicle computer is further configured to receive the one or more POIs as a waypoint on the navigation route.

9. The system of claim 7 wherein the at least one vehicle computer is further configured to:
   receive at least two search parameters relative to the reference point; and identify the one or more POIs correlating with the stored POIs based on the at least two search parameters.

* * * * *